United States Patent
Wang et al.

(10) Patent No.: US 11,638,906 B2
(45) Date of Patent: May 2, 2023

(54) PHOSPHORUS NITRIDE ADSORBENT WITH HIGH-EFFICIENCY SELECTIVITY AND ITS APPLICATIONS IN REMOVING URANIUM POLLUTION AND EXTRACTING URANIUM FROM SEAWATER

(71) Applicant: DONGGUAN UNIVERSITY OF TECHNOLOGY, Dongguan (CN)

(72) Inventors: Gang Wang, Dongguan (CN); Lin Zhao, Dongguan (CN); Shiyong Wang, Dongguan (CN)

(73) Assignee: DONGGUAN UNIVERSITY OF TECHNOLOGY, Dongguan (CN)

( * ) Notice: Subject to any disclaimer, the term of this patent is extended or adjusted under 35 U.S.C. 154(b) by 5 days.

(21) Appl. No.: 17/878,068

(22) Filed: Aug. 1, 2022

(65) Prior Publication Data
US 2023/0080965 A1 Mar. 16, 2023

(30) Foreign Application Priority Data

Sep. 14, 2021 (CN) .......................... 202111076308.0

(51) Int. Cl.
| | |
|---|---|
| *B01J 20/02* | (2006.01) |
| *C01B 21/097* | (2006.01) |
| *G21F 9/12* | (2006.01) |
| *B01J 20/30* | (2006.01) |
| *B01J 20/28* | (2006.01) |

(52) U.S. Cl.
CPC .......... *B01J 20/02* (2013.01); *B01J 20/28023* (2013.01); *B01J 20/3085* (2013.01); *C01B 21/097* (2013.01); *G21F 9/12* (2013.01)

(58) Field of Classification Search
CPC .. B01J 20/02; B01J 20/28023; B01J 20/3085; C01B 21/097; G21F 9/12
USPC ........................................................... 588/20
See application file for complete search history.

(56) References Cited

FOREIGN PATENT DOCUMENTS

CN 108704621 A * 10/2018 ............ B01J 20/264

* cited by examiner

*Primary Examiner* — Edward M Johnson

(57) ABSTRACT

The invention discloses a phosphorus nitride adsorbent with high-efficiency selectivity, and its application thereof. The phosphorus nitride adsorbent has a mutually cross-linked hollow tubular structure. The adsorbent can have an adsorption capacity of 435.58 mg·g$^{-1}$ and 7.01 mg·g$^{-1}$ for spiked seawater and natural seawater with a uranium concentration of 350 ppb, and the adsorbent has a long service life, and can still maintain 91.14% of the initial adsorption capacity after 5 cycles of adsorption and desorption. Taking into account the advantages of a short material preparation cycle, a wide range of raw material sources, a low cost, an excellent adsorption performance, and long service life, the adsorbent can be used in technical fields such as uranium-containing wastewater treatment, uranium ore resource recovery, uranium extraction from seawater and the like.

4 Claims, 5 Drawing Sheets a b

PHOSPHORUS NITRIDE ADSORBENT WITH HIGH-EFFICIENCY SELECTIVITY AND ITS APPLICATIONS IN REMOVING URANIUM POLLUTION AND EXTRACTING URANIUM FROM SEAWATER

TECHNICAL FIELD

The invention relates to a phosphorus nitride adsorbent with high-efficiency selectivity, a preparation method thereof, and applications in removing uranium pollution and extracting uranium from seawater, and belongs to the technical field of adsorbents.

BACKGROUND

The energy crisis caused by the excessive consumption of fossil fuels has become one of the main obstacles to social and economic development. As an important way to meet the demand of energy development, vigorously developing nuclear energy has received extensive attention. Especially in the past 20 years, nuclear energy has gradually been recognized by countries around the world as a mature, safe and efficient clean energy. However, with the growing demand for nuclear power, limited land uranium resources have become an important strategic resource. However, a large amount of uranium-containing water produced by human activities such as unreasonable mining, tailings disposal, and serious nuclear accidents is polluting the ecological water system, causing serious environmental risks due to the toxicity and radioactivity of uranium. In addition, the ocean contains abundant mineral resources, in which the total content of uranium is 4.5 billion tons, 1000 times that of land, but the extremely low concentration ($\approx 3.3$ $\mu g \cdot L^1$), complex seawater environment and numerous competing ions become the main factor limiting the extraction of uranium from seawater. Therefore, separating and enriching uranium elements in various water environments has become one of the keys to treating uranium-containing wastewater, improving the utilization rate of uranium ore resources, and expanding uranium sources. At present, common methods include chemical precipitation, reverse osmosis, electrodialysis, and ion exchange. Compared with these methods, the solid phase separation method has the advantages of high selectivity, a large adsorption capacity, simple operation, easy modularization, a low cost, environmental friendliness, etc.

The core of the solid phase separation method is adsorbent materials. Facing the practical application environment, the adsorbent materials should have the advantages of high selectivity, an efficient adsorption rate, a high adsorption capacity, etc. In addition, considering the industrial application, the adsorbent materials must also meet the conditions of simple preparation, a wide range of sources, reusability, etc. In recent years, new adsorption materials have been developed continuously. Here, adsorption materials are divided into four categories: inorganic materials, organic polymers, carbon materials, and porous framework materials. The first class of inorganic materials includes clay minerals, metal oxides, layered double hydroxides (LDHs), and mesoporous silica (MS) materials, among others. The second class of adsorbents is represented by organic polymers such as resin, cellulose, and chitosan, which have superior skeleton strength and adjustable physical and chemical properties. The third class of adsorbents can be referred to as carbon materials, including activated carbon (AC), mesoporous carbon (MC), carbon nanotubes (CNTs), and graphene oxide (GO), among others. The fourth class is represented by well-designed and developed porous framework materials, including covalent organic frameworks (COFs), porous organic polymers (POPs), and metal-organic frameworks (MOFs). The adsorption effect of adsorbent materials mainly depends on the types of functional groups and the number of functional groups per unit mass. Uranium is a hard Lewis acid that easily forms stable complexes with Lewis bases, including carboxyl groups, phosphates, phosphonates, amino groups, amidoximes, etc. Based on this theory, there is a strong complexing ability between phosphate groups and nitrogen-containing groups and uranium atoms. Hexachlorocyclotriphosphazene has a six-membered ring structure with alternating phosphorus and nitrogen. This unique and easily tunable inorganic framework has aroused great interest in academia, and materials with different properties have been developed, covering super-hydrophobicity, water solubility, cations and anions. When hexachlorocyclotriphosphazene undergoes precipitation polycondensation, the side chains at both ends can introduce functional groups with different properties through nucleophilic substitution reaction. This also provides the possibility to introduce different functional group combinations into the polyphosphazene network.

SUMMARY

In view of the defects of the existing adsorbent technology, the present invention uses hexachlorocyclotriphosphazene and sodium amide as raw materials, and introduces phosphoric acid and nitrogen functional groups in-situ during their polycondensation reaction. Its synergistic complexing ability far exceeds that of a single functional group, and it exhibits superior adsorption capacity and high selectivity when adsorbing uranium ions in uranium-containing wastewater or seawater. In addition, by adjusting the reaction time and the ratio between the reactants, the present invention can effectively control the morphology and structure of the adsorbent, so as to achieve the purpose of enhancing the adsorption effect.

The adsorbent prepared by the invention has the advantages of a low cost, environmental friendliness, high adsorption capacity, strong selectivity, a fast adsorption rate and controllable preparation, and can achieve the goal of effective separation and enrichment of uranium ions from water bodies.

One of the objectives of the present invention is to provide a phosphorus nitride adsorbent, the phosphorus nitride adsorbent has a mutually cross-linked hollow tubular structure.

The second objective of the present invention is to provide a preparation method of the phosphorus nitride adsorbent, specifically including:

(1) uniformly dispersing hexachlorocyclotriphosphazene and sodium amide in a solvent by means of ultrasound to obtain a mixture A;

(2) placing the mixture A in a microwave reactor, with power adjusted to 400-600 W and temperature raised to 160-230° C., and allowing the mixture to react for 3-14 h to obtain a phosphorus nitride intermediate product;

(3) placing the phosphorus nitride intermediate product cooled to room temperature in ethanol for stirring, centrifugation and freeze-drying to obtain the phosphorus nitride adsorbent.

In the above-mentioned technical solution, further, in the step (1), a mass ratio of hexachlorocyclotriphosphazene and sodium amide is 1:(0.4-1).

In the above-mentioned technical solution, further, in the step (1), the solvent is one or more of ethanol, benzene and methanol.

In the above-mentioned technical solution, further, in the step (1), ultrasonic dispersion time is 10-180 min.

In the above-mentioned technical solution, further, in the step (3), a centrifugation rate is 12000 rad/min, and freeze-drying time is 10-24 h.

The third objective of the present invention is applications of the phosphorus nitride adsorbent in treating uranium-containing wastewater and extracting uranium from seawater.

The application of treating uranium-containing wastewater includes:

adjusting a ratio of volume of the uranium-containing wastewater to be treated to mass of the adsorbent to 50 mL:0.01 g, adjusting a pH to 2-9, adsorption temperature to 25-45° C., and adsorption time to 2-180 min, and adding phosphorus nitride material for oscillation adsorption with an oscillating speed of 370 rad/min.

In the above-mentioned technical solution, further, the adsorption time is 60 min, the pH is adjusted to 4.0, and the adsorption temperature is 25° C.

In the above-mentioned technical solution, further, the pH is adjusted with a 0.5 mol/L hydrochloric acid solution and a 1 mol/L sodium hydroxide solution.

The application of extracting uranium from seawater includes:

adjusting a ratio of volume of the seawater to be treated to mass of the adsorbent to 50 L:0.01 g, adsorption temperature to 25° C., and adsorption time to 7-15 days, and controlling a flow rate of the seawater to 3.6 L/h.

One of the objectives of the present invention is achieved as follows: the structural formula and adsorption mechanism of the phosphorus nitride adsorbent are shown in FIG. 1.

The phosphorus nitride adsorbent has a cross-linked hollow tubular structure, which can provide a suitable path for the entry of uranium ions and accelerate the reaction rate. In addition, the widely distributed nitrogen groups and phosphate groups on the surface provide abundant active adsorption sites for uranium ions, which can separate uranium ions from the aqueous environment, and have unique selectivity, distinguishing uranium ions from other competing ions.

The second objective of the present invention is achieved as follows: phosphorus nitrides with different structures are prepared by a simple one-step solvent method. Briefly, solutions containing certain proportions of $NaNH_2$ and $P_3N_3Cl_6$ are uniformly mixed, transferred to a microwave reactor, reacted for several hours, and then freeze-dried for several hours to form phosphorus nitride. The morphology and structure of phosphorus nitride can be adjusted by controlling the reaction time, the reaction temperature and the feed ratio of raw materials.

The third objective of the present invention is achieved as follows: the phosphorus nitride material is used as a uranium adsorbent to extract uranium element from uranium-containing wastewater and natural seawater, respectively. The surface of phosphorus nitride is rich in phosphoric acid groups and nitrogen-containing groups, which can quickly capture uranium ions from seawater and uranium-containing wastewater, with the advantages of high efficiency, a large capacity, strong selectivity, etc. Therefore, the phosphorus nitride adsorbent has broad application prospects in the fields of uranium extraction from seawater, wastewater treatment, uranium ore resource recovery, etc.

Compared with the prior art, the beneficial effects of the present invention are:

1) the phosphorus nitride material of the present invention has a mutually cross-linked hollow tubular microstructure, so that ions can quickly enter the interior of the material. Hydrophilicity is crucial for the adsorption effect of the adsorbent. The phosphoric acid functional group and amino functional group on the surface of phosphorus nitride can improve the hydrophilicity of the material and overcome the hydrophobicity of common organic materials, which greatly improves the effect of uranium adsorption;

2) the phosphorus nitride material of the present invention has a wide range of applications. It can be used for both uranium-containing wastewater treatment and seawater uranium extraction. In the process of treating uranium-containing wastewater, it exhibits the advantages of a large adsorption capacity, a fast adsorption rate, high selectivity, etc. In the process of extracting uranium ions from seawater, it also has excellent adsorption performance, overcoming the interference of carbonate and other metal ions in seawater;

3) the phosphorus nitride preparation process of the present invention has the advantages of a simple process, a short preparation cycle, a wide source of raw materials, controllable morphology, a high yield, a low cost, easy to scale up for industrialized production, etc.; and 4) the phosphorus nitride material of the present invention is reusable, and after repeated adsorption and desorption, phosphorus nitride can still maintain a high adsorption capacity. In addition, phosphorus nitride also has acid and alkali resistance and excellent thermal stability. These features greatly reduce the cost of its applications.

DETAILED DESCRIPTION OF EMBODIMENTS

In order to better illustrate the present invention, further description is given below with reference to practical examples. However, the actual content of the present invention is not limited to this, for example, where the feed ratio needs to be enlarged or reduced in equal proportions.

Embodiment 1

375 mg $P_3N_3Cl_6$ is immersed in 30 mL methanol, and dispersed by ultrasound for 10 min until it is completely dissolved, and then 150 mg NaNH$_2$ is added to the solution; then the suspension is transferred to a round-bottomed flask, and A is placed in a microwave reactor, with power adjusted to 500 W, heated to 160° C., and reacted for 9 h; the solid product is recovered by centrifugation, washed with water and ethanol, and freeze-dried overnight in a freeze dryer to finally obtain a phosphorus nitride material.

Figure 1:
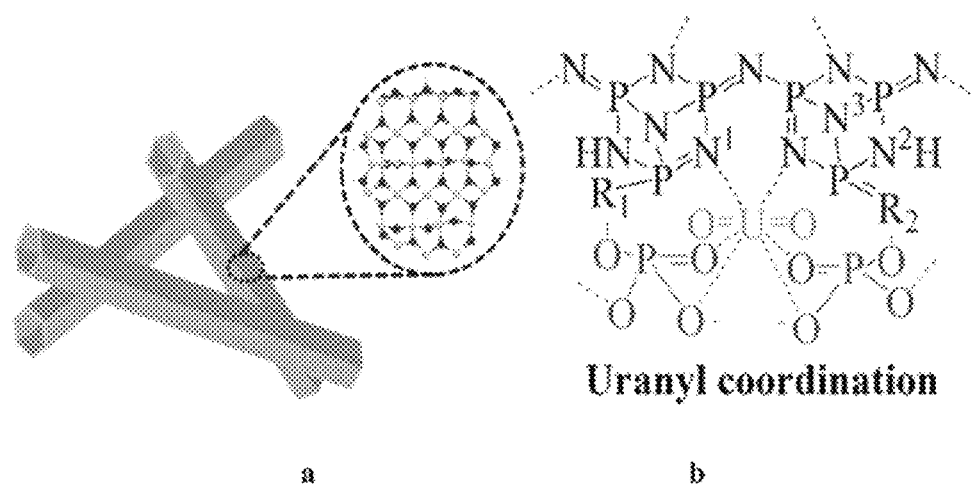
FIG. 1 is a structural formula and adsorption mechanism of the phosphorus nitride adsorbent of the present invention, where a is a structural formula of the phosphorus nitride adsorbent, and b is an adsorption mechanism of the phosphorus nitride adsorbent.
Figure 2:
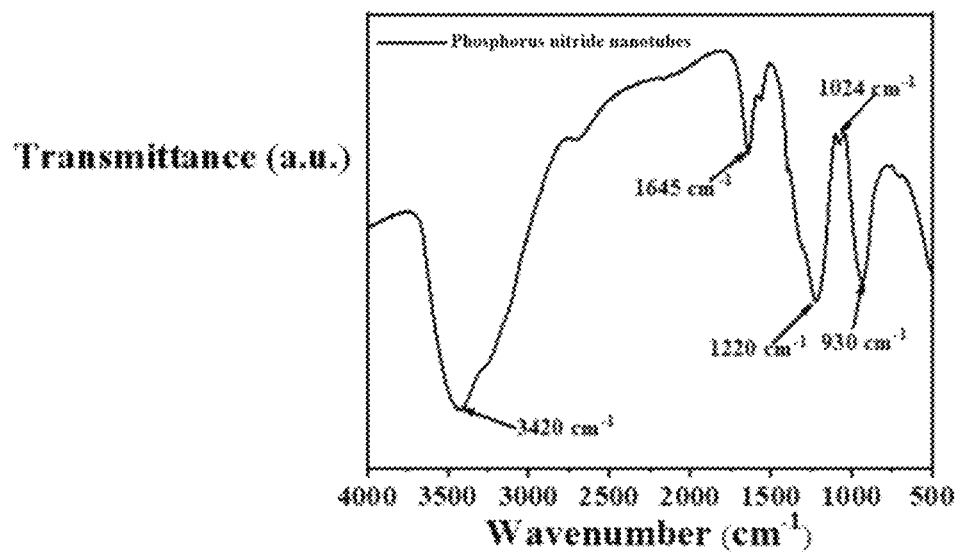
FIG. 2 is an infrared spectrum of the phosphorus nitride adsorbent of the present invention.

An infrared spectrum of the phosphorus nitride material prepared in embodiment 1 is shown in FIG. 2. The broad absorption peak at 3420 cm$^{-1}$ in the figure is attributed to the stretching vibration of —OH in the phosphoric acid group and indicates that the surface of the material has —NH$_2$, the absorption peak at 1645 cm$^{-1}$ is the characteristic peak of benzene ring, the peaks at 1220 cm$^{-1}$ and 930 cm$^{-1}$ belong to the characteristic peaks of P=N and P—N, respectively, and the peak at 1024 cm$^{-1}$ belongs to phosphoric acid groups. The appearance of the above absorption peaks indicates that the phosphorus nitride material is successfully prepared, and the surface of the material is enriched with phosphoric acid groups and nitrogen-containing groups.

Figure 3:
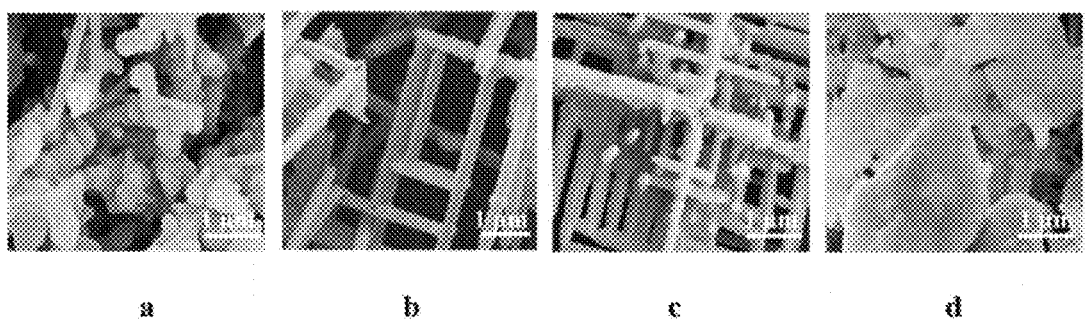
FIG. 3 are scanning electron micrographs of phosphorus nitride adsorbents prepared under different reaction time conditions, where a is 3 h, b is 6 h, c is 9 h, and d is 12 h.
Figure 4:
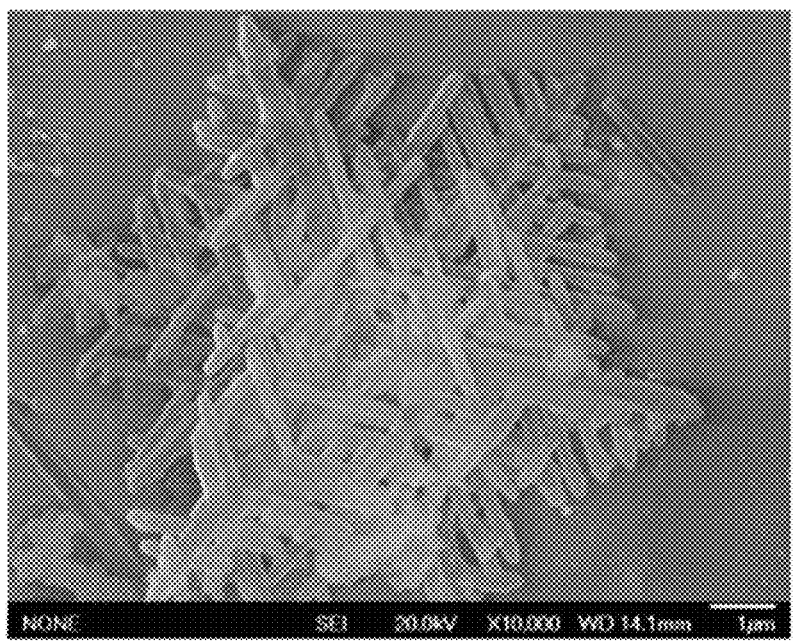
FIG. 4 are scanning electron micrograph and a transmission electron micrograph of the phosphorus nitride adsorbent of the present invention, where a is a scanning electron micrograph, and b is a transmission electron micrograph.
Figure 4:
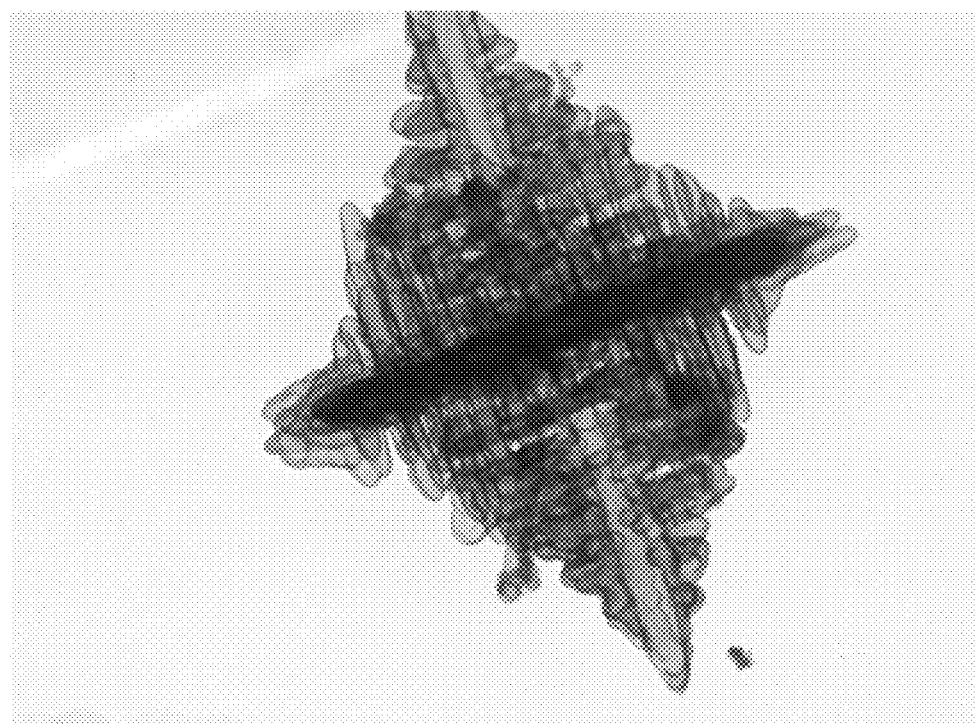

Scanning electron micrographs of phosphorus nitride materials prepared at different reaction times under the conditions of this embodiment are shown in FIG. 3. From FIG. 3, we can clearly see that the structure of the material can be adjusted by the reaction time. As shown in FIG. 4, when the reaction time is 9 h, the prepared phosphorus nitride material presents hollow nanotubes with uniform sizes, which has the best adsorption effect.

Embodiment 2

Phosphorus nitride materials are used to treat uranium-containing wastewater, and the specific method includes:

First, a pH of 50 ml uranium-containing wastewater with a uranium concentration of 25 mg·g$^{-1}$ is adjusted to 4, and then a 10 mg phosphorus nitride material is put into the solution and vibrated for adsorption for 30 min.

Figure 5:
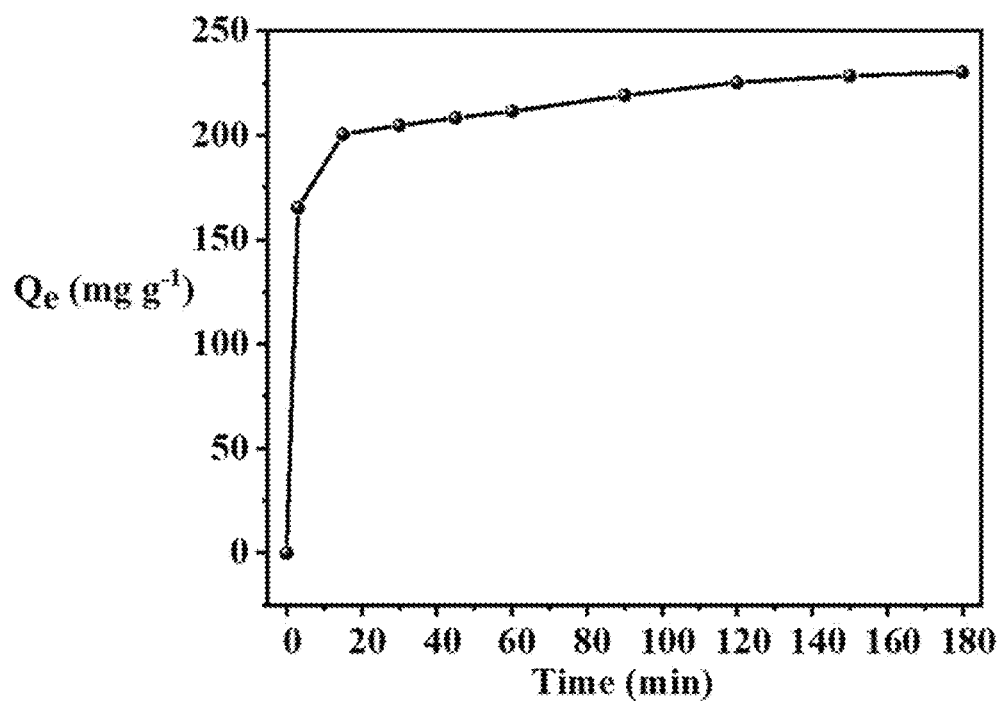
FIG. 5 is a graph showing an adsorption capacity of phosphorus nitride of the present invention as a function of time.

As shown in FIG. 5, the phosphorus nitride material can effectively remove 92.12% of uranium in wastewater, and its adsorption capacity reaches 230.29 mg·g$^{-1}$. The formula for calculating the adsorption capacity is shown in equation 1 below:

$$Q_e=((C_0-C_i)V)/m \quad (1)$$

$Q_e$: adsorption capacity; $C_0$: initial concentration; $C_i$: equilibrium concentration; V: solution volume; m: adsorbent mass.

Embodiment 3

Phosphorus nitride material is used to extract uranium from seawater, and the specific method includes:

A 10 mg phosphorus nitride material is filled into a packed column, the flow rate of seawater is controlled to 3.6 L/h, and adsorption temperature is 25° C.

Figure 6:
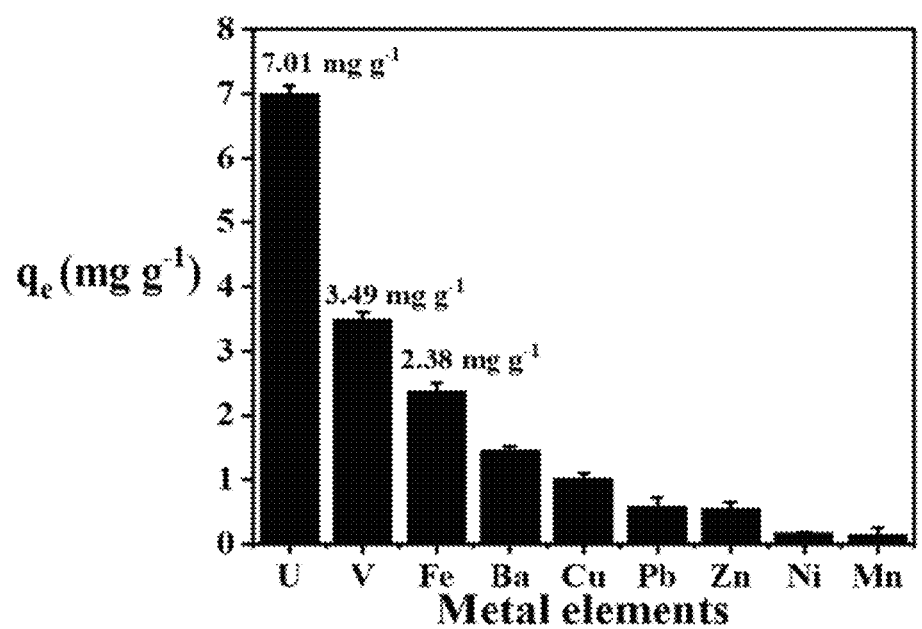
FIG. 6 is an adsorption capacity comparison diagram of the present invention adsorbing various metals from actual seawater.

As shown in FIG. 6, the phosphorus nitride material reaches a high adsorption capacity of 7.01 mg·g$^{-1}$ after 15 days.

Embodiment 4

The specific method for the adsorption and desorption cycle life test of phosphorus nitride includes:

First, a pH of 50 ml uranium-containing wastewater with a uranium concentration of 32 mg·g$^{-1}$ is adjusted to 4, then 10 mg phosphorus nitride is put into the solution, vibrated for adsorption for 30 min, the adsorbent is centrifuged for separation, and finally, it is put into the eluant prepared in advance containing sodium carbonate and hydrogen peroxide, and oscillated for 30 min, which can effectively elute uranium adsorbed on phosphorus nitride.

Figure 7:
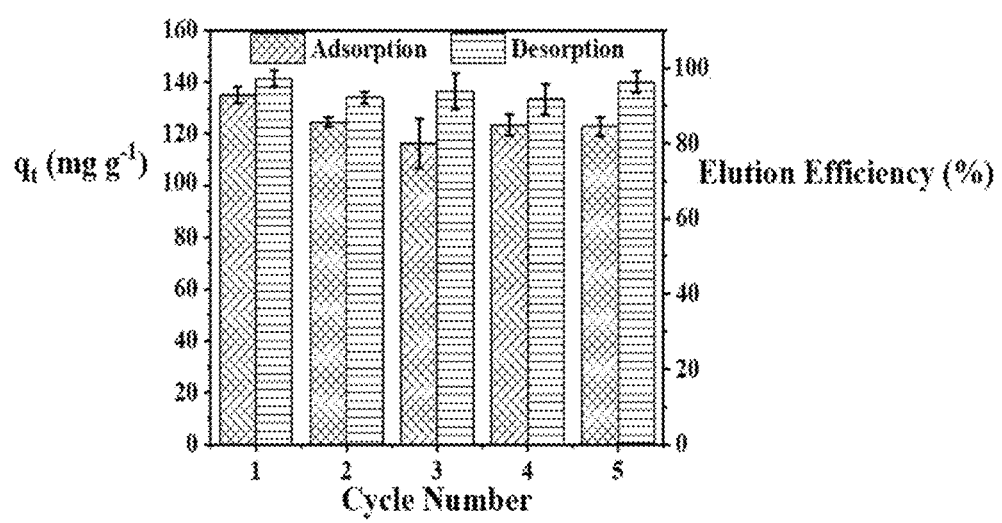
FIG. 7 is a histogram showing the recycling utilization of the phosphorus nitride adsorbent of the present invention.

As shown in FIG. 7, after repeated cycles for 5 times, the adsorption capacity can be maintained at 91.14% of the initial capacity and the elution rate can reach 96%.

The above embodiments are only preferred embodiments of the present invention, and are not intended to limit implementations. The protection scope of the present invention shall be subject to the scope defined by the claims. On the basis of the above description, other different forms of changes or variations can also be made. The obvious changes or variations derived from this are still within the protection scope of the present invention.

What is claimed is:

1. An application of a phosphorus nitride adsorbent in treating uranium-containing wastewater, wherein the application comprises:
adjusting a ratio of volume of the uranium-containing wastewater to be treated to mass of the adsorbent to 50 mL:0.010 g, and adjusting a pH to 2-9, adsorption temperature to 25-45° C., adsorption time to 2-180 min, and an oscillation speed to 370 rad/min.

2. The application according to claim 1, wherein the adsorption time is 60 min, the pH is adjusted to 4.0, and the adsorption temperature is 25° C.

3. The application according to claim 1, wherein the pH is adjusted with a 0.5 mol/L hydrochloric acid solution and a 1 mol/L sodium hydroxide solution.

4. An application of a phosphorus nitride adsorbent in extracting uranium from seawater, wherein the application comprises: adjusting a ratio of volume of the seawater to be treated to mass of the adsorbent to 50 L:0.01 g, adsorption temperature to 25-45° C., and adsorption time to 7-15 days, and controlling a flow rate of the seawater to 3.6 L/h.

* * * * *